United States Patent
Hyeon

(10) Patent No.: US 11,488,519 B2
(45) Date of Patent: Nov. 1, 2022

(54) DISPLAY DEVICE AND METHOD FOR CONTROLLING DISPLAY DEVICE

(71) Applicant: SAMSUNG ELECTRONICS CO., LTD., Suwon-si (KR)

(72) Inventor: Byeongcheol Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/279,945

(22) PCT Filed: Jul. 26, 2019

(86) PCT No.: PCT/KR2019/009320
§ 371 (c)(1),
(2) Date: Mar. 25, 2021

(87) PCT Pub. No.: WO2020/071624
PCT Pub. Date: Apr. 9, 2020

(65) Prior Publication Data
US 2021/0343233 A1    Nov. 4, 2021

(30) Foreign Application Priority Data
Oct. 5, 2018  (KR) .................. 10-2018-0118693

(51) Int. Cl.
G09G 3/32    (2016.01)
(52) U.S. Cl.
CPC ......... *G09G 3/32* (2013.01); *G09G 2300/026* (2013.01); *G09G 2300/0452* (2013.01);
(Continued)

(58) Field of Classification Search
CPC ...... G09G 3/36; G09G 3/3406; G09G 3/3208; G09G 3/3655; G09G 3/32; G09G 3/3216;
(Continued)

(56) References Cited

U.S. PATENT DOCUMENTS 8,120,287 B2    2/2012  Lin et al.
9,035,974 B2    5/2015  Choi et al.
(Continued)

FOREIGN PATENT DOCUMENTS

CN    102165512 A    8/2011
CN    105025635 A    11/2015
(Continued)

OTHER PUBLICATIONS

International Search Report (PCT/ISA/210) dated Nov. 19, 2019, issued by the International Searching Authority in counterpart International Application No. PCT/KR2019/009320.
(Continued)

*Primary Examiner* — Dong Hui Liang
(74) *Attorney, Agent, or Firm* — Sughrue Mion, PLLC

(57) ABSTRACT

A display device and a method for controlling the display device are disclosed. Particularly, the disclosure relates to a display device and a method for controlling the display device. In the display device having a plurality of luminance modes, a display panel is driven by means of adjusting a driving voltage so as to correspond to a changed luminance mode and adjusting a configuration value with respect to an image so as to correspond to the adjusted driving voltage.

9 Claims, 9 Drawing Sheets

(52) U.S. Cl.
CPC ..... *G09G 2300/06* (2013.01); *G09G 2310/08* (2013.01); *G09G 2320/0626* (2013.01); *G09G 2330/021* (2013.01); *G09G 2330/045* (2013.01); *G09G 2360/144* (2013.01)

(58) Field of Classification Search
CPC ... G09G 2320/0626; G09G 2320/0247; G09G 2320/0233; G09G 2320/0252; G09G 2320/0646; G09G 2320/066; G09G 2320/0673; G09G 2330/021; G09G 5/10; G09G 2300/0447; G09G 2300/06; G09G 2300/023; G09G 2300/026; G09G 2340/0435; G09G 2340/16; G09G 2360/16; G09G 2360/144; G09G 16/144; G09F 9/33; G09F 9/335
See application file for complete search history.

(56) References Cited

U.S. PATENT DOCUMENTS

| | | | |
|---|---|---|---|
| 9,119,245 B1 | 8/2015 | Yang | |
| 9,953,573 B2 | 4/2018 | Pyo et al. | |
| 10,062,331 B2 | 8/2018 | Kim et al. | |
| 10,210,807 B2 | 2/2019 | Yim et al. | |
| 10,762,848 B2 | 9/2020 | Yim et al. | |
| 2005/0179639 A1* | 8/2005 | Hsieh | H04N 5/57 345/102 |
| 2006/0164408 A1* | 7/2006 | Nishikawa | G09G 3/3233 345/207 |
| 2008/0297451 A1* | 12/2008 | Marcu | G09G 5/12 345/77 |
| 2009/0015166 A1* | 1/2009 | Kwon | H04N 5/58 315/156 |
| 2011/0095965 A1* | 4/2011 | Yoneoka | G06F 3/1446 345/1.1 |
| 2011/0181793 A1 | 7/2011 | Yamamoto et al. | |
| 2014/0139557 A1* | 5/2014 | Choi | G09G 3/22 345/690 |
| 2016/0351133 A1 | 12/2016 | Kim et al. | |
| 2017/0127013 A1* | 5/2017 | Leng | G09G 3/2092 |
| 2017/0287390 A1* | 10/2017 | Lee | G09G 3/3233 |
| 2018/0061322 A1* | 3/2018 | Yim | G09G 3/3233 |
| 2019/0139493 A1 | 5/2019 | Yim et al. | |
| 2021/0241678 A1* | 8/2021 | Asamura | G09G 3/32 |

FOREIGN PATENT DOCUMENTS

| | | |
|---|---|---|
| CN | 106793252 A | 5/2017 |
| JP | 5898730 B2 | 4/2016 |
| KR | 10-2014-0064137 A | 5/2014 |
| KR | 10-2015-0062311 A | 6/2015 |
| KR | 10-2015-0142830 A | 12/2015 |
| KR | 10-2016-0139677 A | 12/2016 |
| KR | 10-2017-0078433 A | 7/2017 |
| KR | 10-2018-0015370 A | 2/2018 |
| KR | 10-2018-0025508 A | 3/2018 |

OTHER PUBLICATIONS

Written Opinion (PCT/ISA/237) dated Nov. 19, 2019, issued by the International Searching Authority in counterpart International Application No. PCT/KR2019/009320.

Communication dated Aug. 18, 2022 issued by the Korean Intellectual Property Office in counterpart Korean Application No. 10-2018-0118693.

* cited by examiner

DISPLAY DEVICE AND METHOD FOR CONTROLLING DISPLAY DEVICE

TECHNICAL FIELD

This disclosure relates to a display device and a method for controlling a display device, and more particularly, to a display device having a plurality of luminance modes and a method for controlling thereof.

BACKGROUND ART

In a display field, a display device capable of changing between a general mode and a high luminance mode is being developed to ensure high visibility under various illumination environments and to meet a user's needs for a clearer display.

In case of a display device capable of changing between a general mode and a high luminance mode, it is ordinary that a driving voltage is set based on a current corresponding to the high luminance mode to smoothly drive the high luminance, and the driving voltage set in the general mode is maintained.

In the general mode, a driving voltage which is unnecessarily high may be applied to the display device, thereby increasing the power consumption and heat generation of the display device. In particular, in a large display device such as a modular display device, problems of power consumption and heat generation as above may become a more serious problem.

Accordingly, there is a need for a display device capable of driving a display panel smoothly while adaptively changing the driving voltage according to the change of the luminance mode.

DISCLOSURE

Technical Problem

The disclosure has been made to solve the above-described problems, and an object of the disclosure is to provide a display device for effectively providing a luminance mode and a controlling method thereof.

Technical Solution

According to an embodiment, a display device includes a plurality of display modules comprising a display panel to display an image and a panel driving unit to control driving of the display panel, respectively and a plurality of timing controllers configured to control driving of the plurality of display modules.

The plurality of timing controllers may, based on a luminance mode of the display panel being changed from a first luminance mode to a second luminance mode, adjust a size of a driving voltage applied to the display panel to correspond to the second luminance mode, adjust a configuration value with respect to the image to correspond to the adjusted size of the driving voltage, and transmit a control signal with respect to the adjusted size of the driving voltage and the adjusted configuration value to the panel driving unit.

The first luminance mode may be a mode having a luminance of a first range and a second luminance mode is a mode having a luminance of a second range which is different from the first range, a maximum value of the second range may be smaller than a minimum value of the first range, and the plurality of timing controllers may, based on the luminance mode of the display panel being changed from the first luminance mode to the second luminance mode, lower the driving voltage to correspond to the second luminance mode.

The luminance mode may be changed based on information detected through a sensor.

A configuration value of the image may include at least one of a gamma value, a timing register value, a driver integrated circuit (IC) register value, or a color temperature value.

The display device may include a plurality of cabinets comprising the plurality of display modules, respectively, and the plurality of timing controllers may be provided in each of the plurality of cabinets to control a plurality of display modules included in each of the plurality of cabinets.

The display panel may include a plurality of light emitting elements and a plurality of pixel driving circuits to drive the plurality of light emitting elements, and may be divided into a plurality of pixels arranged in a matrix form, each of the plurality of pixels may include a red (R) sub-pixel including a red light emitting element, a green (G) sub-pixel including a green light emitting element, and a blue (B) sub-pixel including a blue light emitting element, and the plurality of pixel driving circuits may be formed with respect to each of the R sub-pixel, the G sub-pixel, and B sub-pixel.

The display panel may be driven in a passive matrix manner according to control of the panel driving unit.

According to an embodiment, a method of controlling a display device including a plurality of display modules including a display panel to display an image and a panel driving unit to control driving of the display panel includes changing a luminance mode of a display panel from a first luminance mode to a second luminance mode; adjusting a size of a driving voltage applied to the display panel to correspond to the second luminance mode; adjusting a configuration value with respect to the image displayed on the display panel to correspond to the adjusted size of the driving voltage; and transmitting a control signal with respect to the adjusted size of the driving voltage and the adjusted configuration value to a panel driving unit.

The first luminance mode may be a mode having a luminance of a first range and a second luminance mode is a mode having a luminance of a second range which is different from the first range, a maximum value of the second range may be smaller than a minimum value of the first range, and the adjusting the size of the driving voltage may include lowering the driving voltage to correspond to the second luminance mode.

The luminance mode may be changed based on information detected through a sensor.

A value of the image may include at least one of a gamma value, a timing register value, a driver integrated circuit (IC) register value, or a color temperature value.

The display panel may include a plurality of light emitting elements and a plurality of pixel driving circuits to drive the plurality of light emitting elements, and are divided into a plurality of pixels arranged in a matrix form, each of the plurality of pixels may include a red (R) sub-pixel including a red light emitting element, a green (G) sub-pixel including a green light emitting element, and a blue (B) sub-pixel including a blue light emitting element, and the plurality of pixel driving circuits may be formed with respect to each of the R sub-pixel, the G sub-pixel, and B sub-pixel.

The display panel may be driven in a passive matrix manner according to control of the panel driving unit.

BEST MODE FOR CARRYING OUT THE INVENTION

Figure 1:
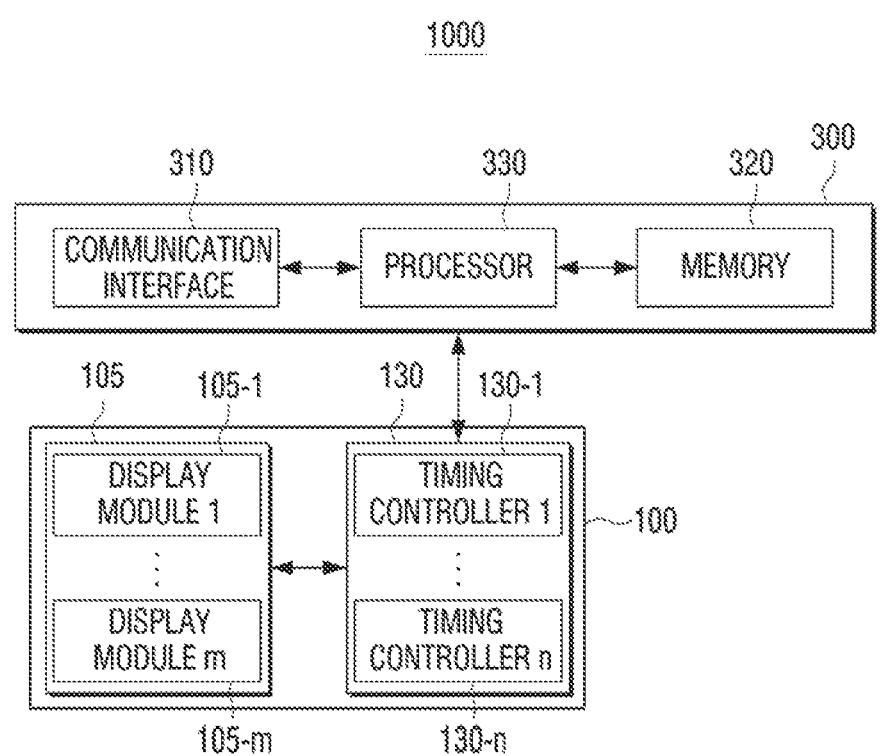
FIG. 1 is a block diagram illustrating a configuration of a display device and an image processing device included in a display system according to an embodiment of the disclosure.

The disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of." The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown).

Hereinafter, the disclosure will be described in detail with reference to the accompanying drawings.

Hereinafter, with reference to the attached drawings, embodiments will be described in detail so that those skilled in the art to which the disclosure belongs to can easily make and use the embodiments. The embodiment may, however, be embodied in many different forms and should not be construed as limited to the embodiments set forth herein. In the drawings, the same reference numerals are used throughout the specification to refer to the same or similar parts throughout the specification to clearly illustrate the embodiment.

Figure 2:
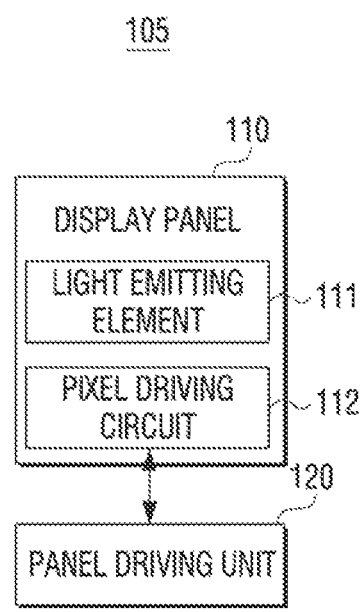
FIG. 2 is a block diagram illustrating a specific configuration of a display module included in a display device according to an embodiment of the disclosure.

FIG. 1 is a block diagram illustrating a configuration of a display device and an image processing device included in a display system according to an embodiment of the disclosure and FIG. 2 is a block diagram illustrating a specific configuration of a display module included in a display device according to an embodiment of the disclosure.

As illustrated in FIG. 1, a display system 1000 includes a display device 100 and an image processing device 300.

The image processing device 300 is a device for processing an input image signal to be provided to the display device 100. For example, the image processing device 300 may be implemented as a sending box, a control box, a set top box, or the like.

As shown in FIG. 1, the image processing device 300 may include a communication interface 310, a memory 320, and a processor 330. However, the configuration is merely exemplary, and a new configuration may be added or some configurations may be omitted.

A communication interface 310 may be connected to the display device 100 to perform communication with the display device 100. The communication interface 310 may be connected to the display device 100 through a cable connected to a port. The cable may be a high definition multimedia interface (HDMI) cable. However, this is merely exemplary, and the cable may be a digital visual interface (DVI) cable, a low voltage differential signals (LVDS) cable, or an optical cable.

The communication interface 310 may be connected to the display device 100 through wireless communication. The interface 310 may include at least one of a Wi-Fi chip, a Bluetooth chip, a wireless communication chip, or a near field communication (NFC) chip.

In one embodiment, an image signal and a control signal according to the disclosure may be transmitted from the image processing device 300 to the display device 100 via the communication interface 310.

Various data required for operation of the image processing device 300 are stored in a memory 320. Image data received from an external device (not shown) may be stored in the memory 320. Here, the external device (not shown) may be a server, a set-top box, a universal serial bus (USB) storage, a personal computer (PC), a smart phone, and the like.

The memory 320 may store at least one command related to the image processing device 300 and an operating system (O/S) for driving the display device 100. The memory 320 may store various software modules for operating the image processing apparatus 300 according to various embodiments, and the processor 330 may execute various software modules stored in the memory 320 to perform the operation of the image forming device 300 according to various embodiments.

The memory 320 may be implemented as a non-volatile memory, a volatile memory, a hard disk drive (HDD), a solid state drive (SSD), a memory card (for example, a micro secure digital (SD) card, and USB memory, or the like), an external memory connectable to an external input port (e.g., a USB memory, or the like).

According to various embodiments, the memory 320 may store image data, and a configuration value for an image such as a gamma value, a timing register value, a driver integrated circuit (IC) register value, a color temperature value, or the like.

It has been described that the data stored in the memory 320 is limited to being related to the image processing device 300, but the data stored in the memory 320 may include the data related to display device 100.

The processor 330 may control the overall operation of the image processing device 300. The processor 330 may transmit an input image received from an external device to the display device 100 via the communication interface 310. The processor 330 may process an input image received from an external device and stored in the memory 320 to obtain an image signal, and may transmit the obtained image signal to the display device 100 via the communication interface 310.

The processor 330 may include one or more of a central processor (CPU), a controller, an application processor (AP), a communication processor (CP), and an advanced reduced instruction set computing (RISC) machine (ARM) processor.

The processor 330 may include a graphic processing unit (GPU) for graphic processing corresponding to the image. The processor 330 may be implemented as a system on chip (SoC) including a core and the GPU. The processor 330 may include a single core, dual cores, triple cores, quad cores, and multiple cores.

The control target of the processor 330 is related to the image processing device 300, but the processor 330 may directly or indirectly control the display device 100 through the communication interface 310.

According to one embodiment, the processor 330 may control to change the luminance mode of a display panel 110 based on the input user command. The processor 330 may obtain a control signal to change the luminance mode of the display panel 110 and transmit the obtained control signal to the display device 100 through the communication interface 310. Accordingly, the luminance mode of the display panel 110 may be changed.

The luminance mode of the display panel 110 may be changed from a first luminance mode to a second luminance mode. The first luminance mode may refer to a mode having a first range of luminance, and the second luminance mode may refer to a mode having a second range of luminance different from the first range.

A maximum value of the second range specifying the second luminance mode may be less than a minimum value of the first range specifying the first luminance mode. The second luminance mode may be a so-called general mode, and the first luminance mode may correspond to the so-called high luminance mode.

For example, the first luminance mode is a mode having a range of a relative luminance value of 101 to 200, and the second luminance mode may be a mode having a range of a relative luminance value of 1 to 100.

The maximum value of the first range specifying the first luminance mode may be less than the maximum value of the second range specifying the second luminance mode. The first luminance mode may be the so-called general mode, and the second luminance mode may correspond to the so-called high luminance mode.

For example, the first luminance mode may be a mode having a range of relative luminance values of 1 to 100, and the second luminance mode may be a mode having a range of relative luminance values of 101 to 200.

The luminance mode of the display panel 110 may include a third luminance mode having a third range of luminance different from the first range of the first luminance mode and the second range of the second luminance mode, as well as the first luminance mode and the second luminance mode.

The first range of the first luminance mode being different from the second range of the second luminance mode does not necessarily mean that there is no overlapping part, but may mean that even if there are some overlapping parts in both ranges, both ranges may be interpreted as different. The range of relative luminance values as the example above is merely exemplary.

The luminance mode as described above may be changed based on user commands inputted through a user interface (not shown), or may be changed based on information detected through a sensor (not shown).

For example, the luminance mode may be changed based on a user command input through a user interface unit, such as a camera, a microphone or a remote control signal receiver, or may be changed based on the illuminance of external light detected by an illuminance sensor.

At least one of the user interface unit and the sensor as described above may be implemented on the display device 100 as well as the image processing device 300. The luminance mode may be changed based on a genre or a provider, or the like, of an image displayed through the display panel 110. For example, if the genre of an image corresponds to a battle movie, the luminance mode may be changed to a general mode, and if the genre of the image corresponds to a document related to the nature, the luminance mode may be changed to a high luminance mode.

If the luminance mode is changed as described above, a notification may be provided to guide the change of the luminance mode to the user through the display panel 110.

The display device 100 included in the display system 1000 will be described below.

The display device 100 is a device capable of displaying an image based on an image signal received from the image processing device 300 and may be the display device 100 such as a digital television (TV), a monitor, a projection TV, or the like.

As shown in FIG. 1, the display device 100 includes a plurality of display modules 105-1, . . . , 105-m, and a plurality of timing controllers 130-1, . . . , 130-n. Also, as shown in FIG. 2, each of the display modules 105 may include the display panel 110 for displaying images and a panel driving unit 120 controlling the driving of the display panel 110.

The configuration is exemplary and new configurations may be added in addition to such a configuration, or some configurations may be omitted.

The display panel 110 displays an image. As shown in FIG. 2, the display panel 110 includes a plurality of light emitting elements and a plurality of pixel driving circuits connected to the light emitting elements.

Each of the plurality of light emitting elements 111 may include a light emitting layer and an n-type semiconductor layer and a p-type semiconductor layer laminated on the upper and lower portions of the light emitting layer, and may emit light by the control of the panel driving unit 120.

The light-emitting layer is located between the n-type semiconductor and the p-type semiconductor, and is a layer where an electron which is a carrier of the n-type semiconductor and a hole which is a carrier of the p-type semiconductor meet. When electrons and holes meet in the light emitting layer, a potential barrier is formed as the electrons and holes are recombined. When the electrons and holes transition to a low energy level beyond the potential barrier according to the applied voltage, light of the corresponding wavelength is generated.

The light emitting element 111 may be a general light emitting diode (LED), and may be a micro LED having a size of 10 μm to 100 μm, particularly. In addition, if the light emitting element 111 is a light emitting device which is consistent with the purpose of various embodiments of the disclosure, a type thereof is not particularly limited.

A plurality of pixel driving circuits 112 may drive a plurality of light emitting elements 111. A plurality of light emitting elements 111 may be mounted on a driving circuit layer including a plurality of pixel driving circuits 112, so that a plurality of pixel driving circuits 112 are electrically connected to a plurality of light emitting elements 111, and each of the plurality of light emitting elements 111 may form a sub pixel of the display panel 110. The pixel configuration of the display panel 110 will be described below with reference to FIGS. 5A and 5B.

The plurality of timing controllers may control the driving of the plurality of display modules 105. The plurality of timing controllers may control the driving of the display panel 110 by controlling the panel driving unit included in the plurality of display modules 105. If an image signal and a control signal are received from the image processing device 300, the plurality of timing controllers 130 may control the driving of the panel driving unit 120 and the display panel 110 based on the received image signal and the control signal.

As described below in the description of FIGS. 4A and 4B, the timing controller 130 according to one embodiment may be embedded in each of a plurality of cabinets 200 and may be implemented to control the plurality of display modules 105 included in each of the plurality of cabinets 200.

The number of the display modules 105 controlled by each of the plurality of timing controllers 130 has no specific limit, and the number of timing controllers 130 provided by each cabinet 200 may be variously changed if within the range capable of achieving the purpose of the disclosure.

The connection structure of the plurality of cabinets 200 and the display modules 105 included in each of the plurality of cabinets will be described in detail in the description of FIGS. 4A and 4B. According to one embodiment, the plurality of timing controllers 130 may adjust a configuration value of an image and the size of the driving voltage applied to the display panel 110 when the luminance mode of the display panel 110 included in each of the display modules 105 is changed.

When the luminance mode of the display panel 110 changes from the first luminance mode to the second luminance mode, the plurality of timing controllers may adjust the size of the driving voltage applied to the display panel 110 to correspond to the second luminance mode. The first luminance mode is a mode having a first range of luminance, and the second luminance mode may refer to a mode having a second range of luminance different from the first range.

For example, if the maximum value of the second luminance mode is less than the minimum value of the first luminance mode, when the luminance mode of the display panel 110 changes from the first luminance mode to the second luminance mode, the plurality of timing controllers 130 may lower the driving voltage to correspond to the second luminance mode. When the luminance mode changes from the high luminance mode to the general mode, the plurality of timing controllers 130 may lower the driving voltage to correspond to the general mode.

When the size of the driving voltage is adjusted to correspond to the luminance mode of the display panel 110, there may be a necessity to change the configuration value for the image to correspond to the size of the adjusted driving voltage.

The plurality of timing controllers 130 may adjust the configuration value for the image to correspond to the adjusted size of the driving voltage.

For example, when the luminance mode of the display panel 110 is changed from the high luminance mode to the general mode, the plurality of timing controllers 130 may lower the driving voltage to correspond to the general mode, and may adjust at least one of a gamma value, a timing register value, a driver integrated circuit (IC) register value, and a color temperature value to correspond to a lowered driving voltage.

The plurality of timing controllers 130 may transmit a control signal for the adjusted driving voltage and the adjusted configuration value to the panel driving unit 120 as described above.

The plurality of timing controllers 130, as described above, may be referred to in the art as a timing controller (T-CON), a data hub, a receiving card, a controller, or the like, but may be applied to the disclosure without having to be limited to a specific name if the configuration may adjust the driving voltage and play a role of adjusting the configuration value for the image.

The panel driving unit 120 may control the driving of the display panel 110. The panel driving unit 120 may include a plurality of driver ICs. The plurality of driver ICs included in the panel driving unit 120 may control the light emission of the plurality of light emitting elements 111 connected to each of the plurality of pixel driving circuits 112 by driving the plurality of pixel driving circuits 112 by applying a voltage.

There is no particular limitation on the driving method of the display panel 110 according to the disclosure. The driving of the display panel 110 may be performed in a passive matrix manner and may be formed in an active matrix manner.

Although not shown, the panel driving unit 120 may further include a graphic RAM (GRAM) and power generating circuits. The GRAM may function as a memory for temporarily storing data to be inputted into the driver IC. The power generating circuits may generate a voltage to drive the display panel 110 and supply a voltage to the driver IC.

In one embodiment, when the plurality of timing controllers 130 transmit a control signal relative to the adjusted size of the adjusted driving voltage and the adjusted configuration value to the panel driving unit 120, the panel driving unit 120 may control the driving of the display panel 110 based on the received control signal.

It has been described that the image processing device 300 is implemented as a separate device from the display device 100, but the disclosure is not limited thereto. That is, the configuration of the image processing device 300 as described above may be implemented as an image processing unit included in the display device 100 and may perform the functions described above.

At least one of the configuration of the image processing device 300 as described above may be implemented to be included in the display device 100, and in this example, the configuration included in the display device 100 may perform the same function as if included in the image processing device 300.

According to an embodiment of the disclosure as described above, in the display device 100 having a plurality of luminance modes, the display panel 110 may be driven by adjusting a size of the driving voltage and a configuration value of an image adaptively according to a change of the luminance mode. Accordingly, increase in power consumption and heat generation may be prevented by preventing unnecessary amount of the driving voltage from being applied to the display panel 110.

Figure 3A:
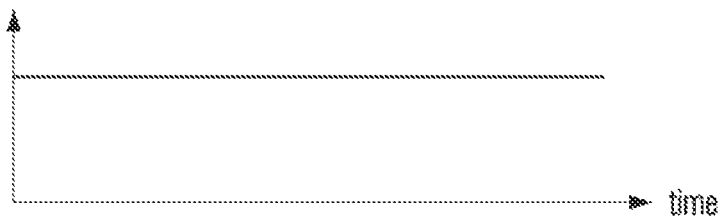
FIGS. 3A and 3B are graphs for visually illustrating the adjustment of the driving current and the driving voltage according to the change in the luminance mode as compared to a related art.
Figure 3A:
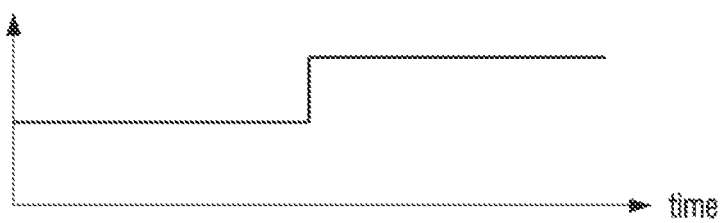
Figure 3A:
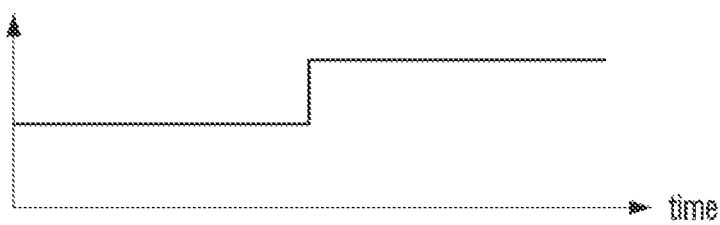
Figure 3B:
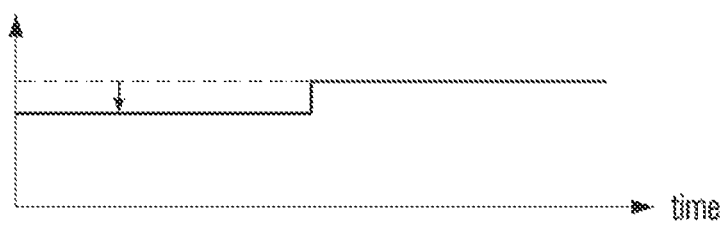
Figure 3B:
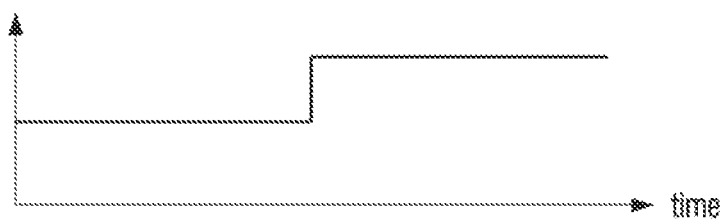
Figure 3B:
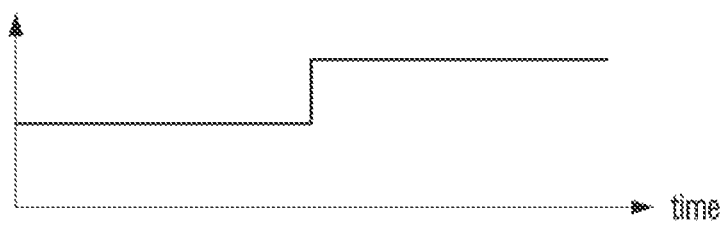

FIGS. 3A and 3B are graphs for visually illustrating the adjustment of the driving current and the driving voltage according to the change in the luminance mode as compared to a related art.

FIG. 3A is a diagram illustrating a related art, and FIG. 3B is a diagram illustrating the disclosure.

As shown in FIG. 3A, in the related art, when the luminance mode of the display panel changes, the driving current may be adjusted to correspond to the changed luminance mode, but the size of the driving voltage is maintained constant.

As shown in FIG. 3b, when the luminance mode of the display panel 110 is changed, the size of the driving current may be adjusted to correspond to the changed luminance mode, and the size of the driving voltage may be adjusted to correspond to the changed luminance mode.

When the luminance mode of the display panel 110 is changed from the general mode to the high luminance mode, the size of the driving voltage may be adjusted to correspond to the high luminance mode, and if the luminance mode changes from the high luminance mode to the general mode, the size of the driving voltage may be adjusted to correspond to the general mode.

Figure 4A:
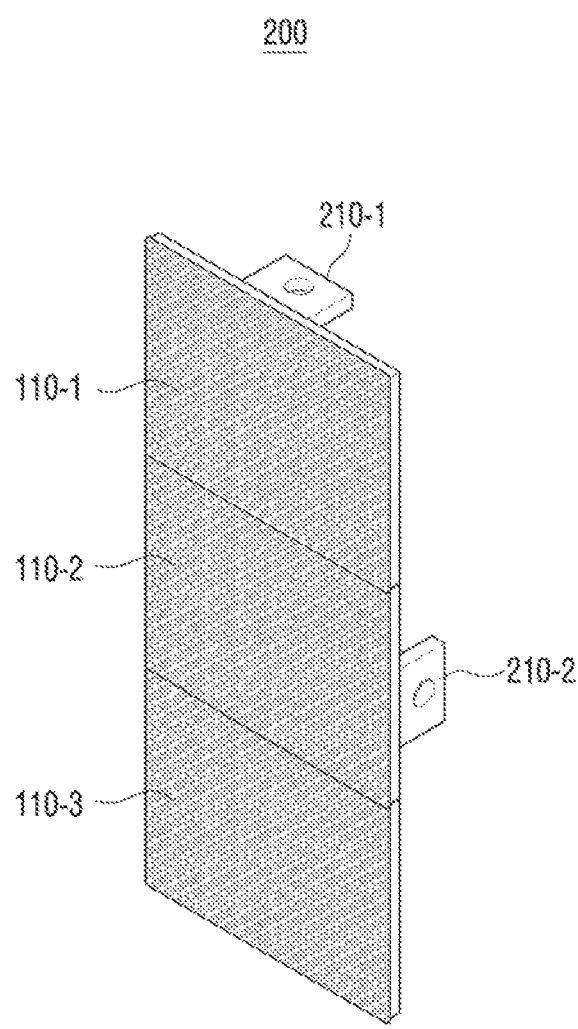
FIGS. 4A and 4B are diagrams illustrating a structure in which a display device is implemented as a modular display in detail according to an embodiment of the disclosure.
Figure 4B:
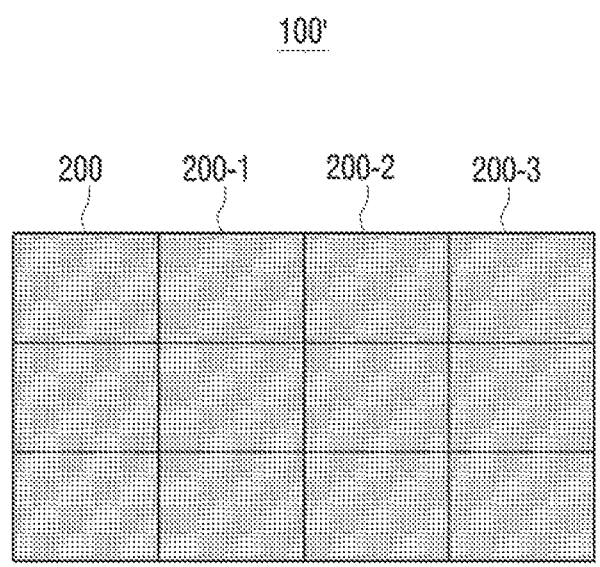

FIGS. 4A and 4B are diagrams illustrating a structure in which a display device is implemented as a modular display in detail according to an embodiment of the disclosure.

As shown in FIG. 4A, a display device 100' according to one embodiment may include the cabinet 200. The cabinet 200 may include a plurality of display modules 105-1, 105-2, and 105-3. Each of the plurality of display modules 105-1, 105-2, and 105-3 may include the display panel 110 and the panel driving unit 120 as described above in FIGS. 1-3.

FIG. 4A illustrates a case in which the plurality of display modules 105-1, 105-2, 105-3 are combined in an array of 1×3 in an example of the cabinet 200, but the arrangement and number of the display modules 105-1, 105-2, 105-3 may be variously changed.

The cabinet 200 may include a base plate (not shown) for mounting the plurality of display modules 105-1, 105-2, 105-3. Each of the display modules 105-1, 105-2, and 105-3 may be mounted on the front surface of the base plate.

The cabinet 200 according to one embodiment may be embodied in a form without a bezel, and in the case of the modular display device 100' in which a plurality of cabinets 200 are combined, a seamless image in which there is no disconnection between the cabinets 200 may be displayed.

According to an embodiment, the cabinet 200 may include a plurality of coupling parts 210-1, 210-2 capable of being combined with another cabinet 200. Accordingly, the cabinet 200 according to one embodiment may be implemented with the modular display device 100' through a connection with another cabinet 200.

For example, referring to FIG. 4B, the cabinet 200 according to one embodiment may be implemented with the modular display device 100' such as a video wall by being coupled to a plurality of other cabinets 200-1, 200-2, 200-3 by 4x1. However, the arrangement and number of the cabinets 200, 200-1, 200-2, and 200-3 may vary in various ways.

The plurality of timing controllers 130 according to one embodiment may be provided in each of the plurality of cabinets 200, 200-1, 200-2, 200-3 as described above and may be implemented to control a plurality of display modules 105-1, 105-2, 105-3 included in each of the plurality of cabinets 200, 200-1, 200-2, and 200-3.

Controlling the plurality of display modules 105-1, 105-2, and 105-3 may refer to controlling the display panel 110 included in each of the plurality of display modules 105-1, 105-2, and 105-3 by controlling the panel driving unit 120 included in each of the display modules 105-1, 105-2, and 105-3.

The processor 330 may control a plurality of timing controllers 130 included in each of the plurality of cabinets 200, 200-1, 200-2, 200-3. The processor 330 may control a plurality of timing controllers 130 included in each of the plurality of cabinets 200, 200-1, 200-2, 200-3 through an interface (not shown).

One timing controller 130 may be provided for each of the plurality of cabinets 200, 200-1, 200-2, 200-3, but the number of timing controllers 130 included in each of the plurality of cabinets 200, 200-1, 200-2, 200-3 may be changed in various ways.

According to various embodiments, by adjusting the size of the driving voltage and configuration value for an image adaptively according to the change in the luminance mode, it may be prevented to apply unnecessary driving voltage to the display panel 110 and thus, an effect therefrom may be more prominent in a large display device such as the modular display device 100'.

Figure 5A:
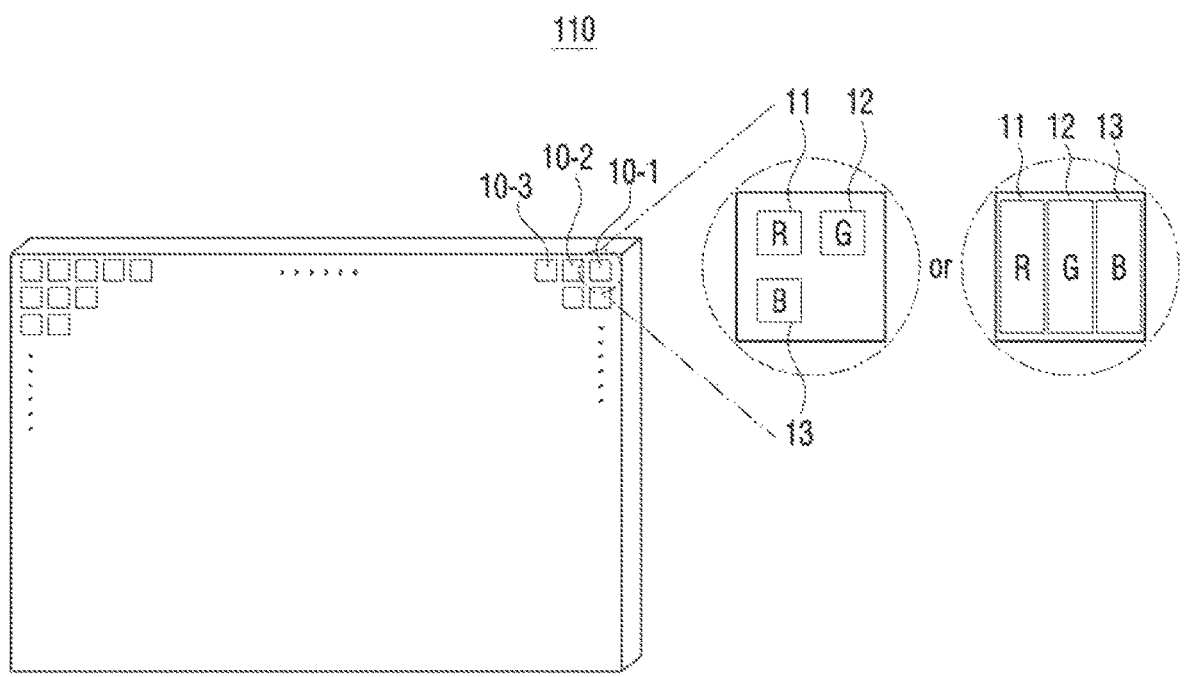
FIGS. 5A and 5B are diagrams illustrating pixel configurations of a display panel according to an embodiment of the disclosure.
Figure 5B:
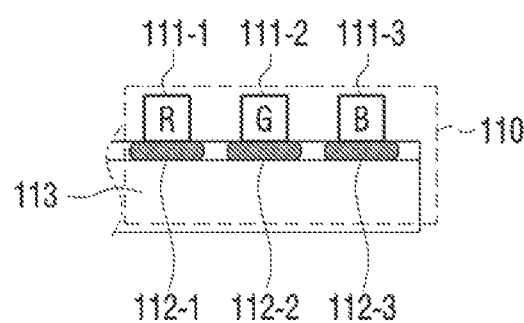

FIGS. 5A and 5B are diagrams illustrating pixel configurations of a display panel according to an embodiment of the disclosure.

As shown in FIG. 5A, the display panel 110 according to one embodiment may be divided into a plurality of pixels 10-1, 10-2, 10-3 arranged in a matrix form. Each of the pixels 10-1, 10-2, 10-3 may include an R sub-pixel 11, a G sub-pixel 12, and a B sub-pixel 13.

As shown in FIG. 5A, R, G, and B sub-pixels 11, 12, 13 may be arranged in a matrix form or sequentially arranged in one pixel 10. However, the plurality of sub-pixels 11, 12, and 13 may be arranged in various shapes in each pixel 10-1, 10-2, and 10-3.

As illustrated in FIG. 5B, the display panel 110 may include light emitting elements 111-1, 111-2, 111-3 that constitute each of a plurality of sub-pixels 11, 12, 13, and pixel driving circuits 112-1, 112-2, 112-3 for driving the light-emitting elements.

For example, the display panel 110 may include a red light emitting element 1110-1 constituting the R sub-pixel 11, a green light emitting element 111-2 constituting the G sub-pixel 12, and a blue light emitting element 111-3 constituting the B sub-pixel 13.

So that a plurality of pixel driving circuits 112-1, 112-2, 112-3 are electrically connected to a plurality of light emitting elements 111-1, 111-2, 111-3, the plurality of light emitting elements 111-1, 111-2, 111-3 may be mounted on each of the plurality of pixel driving circuits 112-1, 112-2, 112-3 formed on one side of the substrate, and each of a plurality of light emitting elements may configure a subpixel of the display panel 110.

According to one embodiment, when the plurality of timing controllers 130 transmit the control signal for the adjusted size of the driving voltage and the adjusted configuration value to the panel driving unit 120, the panel driving unit 120 may control the driving of the display panel 110 based on the received control signal, and the panel driving unit 120, specifically, may control the driving of each of the light emitting elements 111-1, 111-2, 111-3 constituting the sub-pixels 11, 12, 13 of the display panel 110 based on the received control signal.

Figure 6:
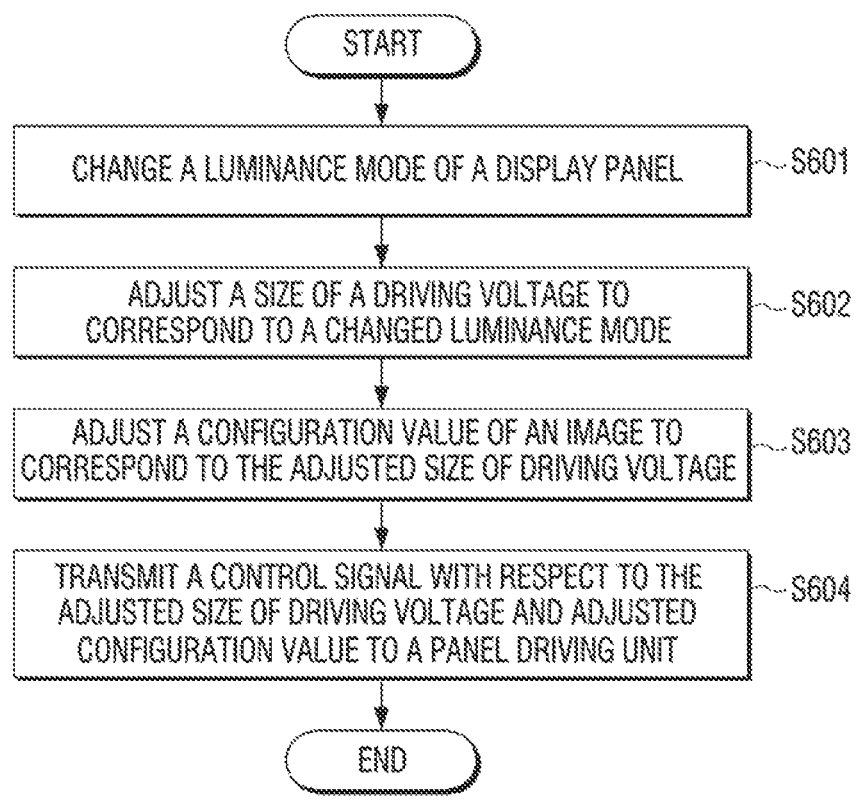
FIG. 6 is a flowchart illustrating a method for controlling a display device according to an embodiment of the disclosure.

FIG. 6 is a flowchart illustrating a method for controlling a display device according to an embodiment of the disclosure.

According to the controlling method of the display device 100, if the luminance mode of the display panel 110 changes from the first luminance mode to the second luminance mode in operation S601, the size of the driving voltage applied to the display panel may be adjusted to correspond to the second luminance mode in operation S602. For example, when the luminance mode of the display panel 110 is changed from the high luminance mode to the general mode, the driving voltage may be lowered to correspond to the general mode.

If the size of the driving voltage is adjusted to correspond to the second luminance mode, the configuration value for the image may be adjusted to correspond to the adjusted driving voltage in operation S603. The configuration value for the image may include at least one of a gamma value, a timing register value, a driver IC register value, and a color temperature value.

If the size of the driving voltage and the configuration value for the image are adjusted, the control signal for the adjusted size of the driving voltage and the control signal for the adjusted configuration value may be transmitted to the panel driving unit 120 in operation S604.

If the control signal for the adjusted driving voltage and the adjusted configuration value is transmitted to the panel driving unit 120, the panel driving unit 120 may control the driving of the display panel 110 based on the received control signal.

According to various embodiments as described above, in the display device 100 having a plurality of luminance modes, the display panel 110 may be driven by adaptively adjusting the size of the driving voltage and the configuration value of the image according to the change of the luminance mode. Accordingly, increase in power consumption and heat generation may be prevented by preventing the unnecessary driving voltage from being applied to the display panel 110.

The controlling method of the display device 100 according to the embodiment described above may be implemented as a program and provided to the display device 100. In particular, a program including a controlling method of the display device 100 may be stored in a non-transitory computer readable medium and provided.

A non-transitory computer-readable medium refers to a medium that stores data semi-permanently, rather than a medium that stores data for a short moment, such as a register, cache, memory, etc., and refers to a medium readable by a device. Specifically, the programs for performing the various methods described above may be stored and provided in a non-transitory readable medium, such as a compact disc (CD), a digital video disc (DVD), a hard disk, a Blu-ray disc, a universal serial bus (USB), a memory card, a read-only memory (ROM), etc.

While the disclosure has been shown and described with reference to various example embodiments thereof, it will be understood by those skilled in the art that various changes in form and details may be made therein without departing from the spirit and scope of the disclosure as defined by the appended claims and their equivalents.

What is claimed is:

1. A display device comprising:
   a plurality of display modules comprising a display panel to display an image and a panel driving unit to control driving of the display panel, respectively; and
   a plurality of timing controllers configured to control driving of the plurality of display modules,
   wherein the plurality of timing controllers are further configured to:
   based on a luminance mode of the display panel being changed from a first luminance mode to a second luminance mode, adjust a size of a driving voltage applied to the display panel to correspond to the second luminance mode, adjust a configuration value with respect to the image to correspond to the adjusted size of the driving voltage, and transmit a control signal with respect to the adjusted size of the driving voltage and the adjusted configuration value to the panel driving unit,
   wherein the configuration value with respect to the image is related to a color of the image displayed on the display, wherein the configuration value with respect to the image comprises a gamma value, a timing register value, a driver integrated circuit (IC) register value and a color temperature value, wherein the first luminance mode is a mode having a luminance of a first range and the second luminance mode is a mode having a luminance of a second range which is different from the first range, wherein a maximum value of the second range is smaller than a minimum value of the first range, wherein the luminance mode of the display panel is changed based on a type of the image displayed on the display panel, and wherein the plurality of timing controllers are further configured to:
- based on the luminance mode of the display panel being changed from the first luminance mode to the second luminance mode, decrease the driving voltage to correspond to the second luminance mode, and adjust the configuration value with respect to the image to correspond to the decreased size of the driving voltage, and
- based on the luminance mode of the display panel being changed from the second luminance mode to the first luminance mode, increase the driving voltage to correspond to the second luminance mode, and adjust the configuration value with respect to the image to correspond to the increased size of the driving voltage.

2. The display device of claim 1, wherein the luminance mode is changed based on information detected through a sensor.

3. The display device of claim 1, wherein the display device comprises a plurality of cabinets, the plurality of cabinets comprising the plurality of display modules, respectively, and
wherein the plurality of timing controllers are provided in each of the plurality of cabinets to control a plurality of display modules included in each of the plurality of cabinets.

4. The display device of claim 1, wherein the display panel comprises a plurality of light emitting elements and a plurality of pixel driving circuits to drive the plurality of light emitting elements, and are divided into a plurality of pixels arranged in a matrix form,
wherein each of the plurality of pixels comprises a red (R) sub-pixel including a red light emitting element, a green (G) sub-pixel including a green light emitting element, and a blue (B) sub-pixel including a blue light emitting element, and
wherein the plurality of pixel driving circuits are formed with respect to each of the R sub-pixel, the G sub-pixel, and B sub-pixel.

5. The display device of claim 1, wherein the display panel is driven in a passive matrix manner according to control of the panel driving unit.

6. A method of controlling a display device comprising a plurality of display modules including a display panel to display an image and a panel driving unit to control driving of the display panel, the method comprising:

changing a luminance mode of a display panel from a first luminance mode to a second luminance mode;

adjusting a size of a driving voltage applied to the display panel to correspond to the second luminance mode;

adjusting a configuration value with respect to the image displayed on the display panel to correspond to the adjusted size of the driving voltage; and transmitting a control signal with respect to the adjusted size of the driving voltage and the adjusted configuration value to a panel driving unit, wherein the configuration value with respect to the image is related to a color of the image displayed on the display, wherein the configuration value with respect to the image comprises a gamma value, a timing register value, a driver integrated circuit (IC) register value and a color temperature value, wherein the first luminance mode is a mode having a luminance of a first range and a second luminance mode is a mode having a luminance of a second range which is different from the first range, wherein a maximum value of the second range is smaller than a minimum value of the first range, wherein the luminance mode of the display panel is changed based on a type of the image displayed on the display panel, and wherein the method further comprises:
- based on the luminance mode of the display panel being changed from the first luminance mode to the second luminance mode, decrease the driving voltage to correspond to the second luminance mode, and adjust the configuration value with respect to the image to correspond to the decreased size of the driving voltage, and
- based on the luminance mode of the display panel being changed from the second luminance mode to the first luminance mode, increase the driving voltage to correspond to the second luminance mode, and adjust the configuration value with respect to the image to correspond to the increased size of the driving voltage.

7. The method of claim 6, wherein the luminance mode is changed based on information detected through a sensor.

8. The method of claim 6, wherein the display panel comprises a plurality of light emitting elements and a plurality of pixel driving circuits to drive the plurality of light emitting elements, and are divided into a plurality of pixels arranged in a matrix form,
wherein each of the plurality of pixels comprises a red (R) sub-pixel including a red light emitting element, a green (G) sub-pixel including a green light emitting element, and a blue (B) sub-pixel including a blue light emitting element, and
wherein the plurality of pixel driving circuits are formed with respect to each of the R sub-pixel, the G sub-pixel, and B sub-pixel.

9. The method of claim 6, wherein the display panel is driven in a passive matrix manner according to control of the panel driving unit.

* * * * *